US012615179B2

(12) United States Patent
Mariyani et al.

(10) Patent No.: US 12,615,179 B2
(45) Date of Patent: Apr. 28, 2026

(54) CONNECTIVITY FAILURE SOLUTIONS FOR CONTAINER PLATFORMS

(71) Applicant: T-Mobile Innovations LLC, Overland Park, KS (US)

(72) Inventors: Anil Kumar Mariyani, Ashburn, VA (US); Ramesh Golla, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/388,002

(22) Filed: Nov. 8, 2023

(65) Prior Publication Data
US 2025/0150333 A1 May 8, 2025

(51) Int. Cl.
H04L 41/0663 (2022.01)
H04L 43/0817 (2022.01)

(52) U.S. Cl.
CPC ...... H04L 41/0663 (2013.01); H04L 43/0817 (2013.01)

(58) Field of Classification Search
CPC .................... H04L 41/0663; H04L 43/0817
See application file for complete search history.

(56) References Cited

U.S. PATENT DOCUMENTS

| | | | | |
|---|---|---|---|---|
| 8,856,281 B2 * | 10/2014 | Van der Merwe | ...... | H04L 67/01 709/219 |
| 9,092,397 B1 * | 7/2015 | Kurtz | ................. | G06F 11/2038 |
| 2022/0114004 A1 | 4/2022 | Hsu | | |
| 2022/0182318 A1 * | 6/2022 | Shilimkar | .......... | H04L 61/5007 |
| 2023/0071714 A1 | 3/2023 | Huo et al. | | |
| 2023/0305813 A1 * | 9/2023 | Jalal | ........................ | G06F 9/455 |

OTHER PUBLICATIONS

Microsoft, "Reliability in Azure App Service", Sep. 26, 2023, Microsoft, https://learn.microsoft.com/en-us/azure/reliability/reliability-app-service?tabs=graph%2Ccli, all pages (Year: 2023).*

* cited by examiner

*Primary Examiner* — Hua Fan
(74) *Attorney, Agent, or Firm* — Jones Burke, PLLC

(57) ABSTRACT
Systems, methods and non-transitory computer-readable mediums are provided for remediating failures in container-based telecommunications systems. A method includes accessing by a container as a service (CaaS) server a continuous integration (CI)/continuous delivery (CD) tool server. The method additionally includes experiencing a connectivity failure with the CI/CD tool server and accessing by the CaaS server an alternative repository created through real time replication of the CI/CD tool server contents.

20 Claims, 8 Drawing Sheets

600

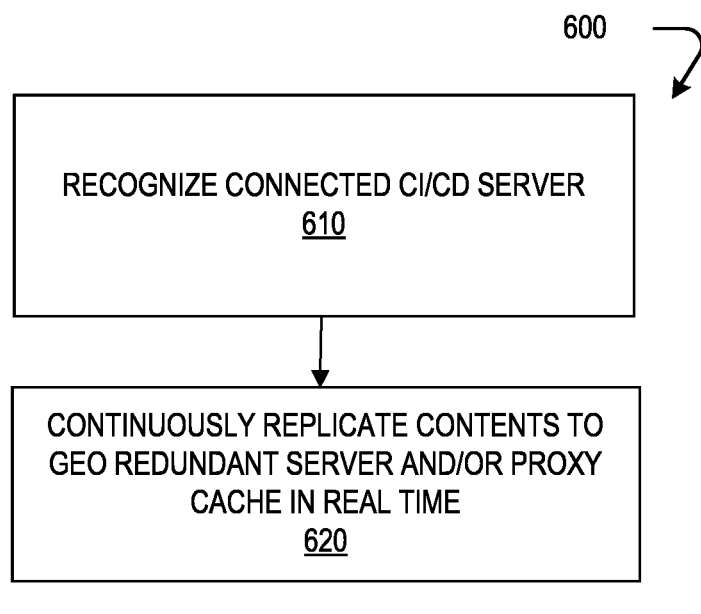

RECOGNIZE CONNECTED CI/CD SERVER
610

CONTINUOUSLY REPLICATE CONTENTS TO
GEO REDUNDANT SERVER AND/OR PROXY
CACHE IN REAL TIME
620

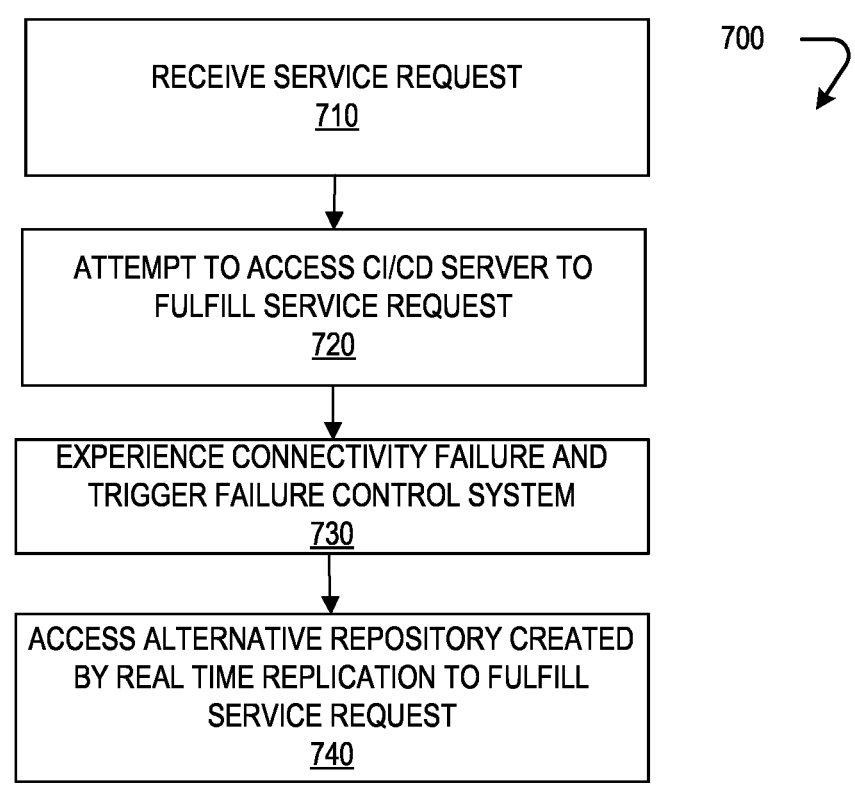

RECEIVE SERVICE REQUEST
710

ATTEMPT TO ACCESS CI/CD SERVER TO
FULFILL SERVICE REQUEST
720

EXPERIENCE CONNECTIVITY FAILURE AND
TRIGGER FAILURE CONTROL SYSTEM
730

ACCESS ALTERNATIVE REPOSITORY CREATED
BY REAL TIME REPLICATION TO FULFILL
SERVICE REQUEST
740

FIG. 7

LISTEN FOR READINESS INDICATOR FROM
CI/CD SERVER
810

READINESS
INDICATOR RECEIVED?
820

NO                                          YES

FULFILL REQUESTS FROM BACKUP
830

FULFILL REQUESTS FROM LOCAL TOOL
SERVER 840

CONNECTIVITY FAILURE SOLUTIONS FOR CONTAINER PLATFORMS

In a telecommunications environment, technology has evolved for handling requests from wireless devices or user equipment (UEs). Current technologies allow for the use of containers in a continuous integration. Currently, Kuburnetes (K8) operates a container orchestration system in a (CI)/continuous delivery (CD) environment such that software for fulfilling wireless device requests can be managed in an automated manner. Continuous integration is focused on automatically building and testing code, whereas continuous delivery automates the software release process.

With K8, containers may control one or more pods. In the event of either a container or pod restart, the containers or pods may fail to fetch required files for fulfilling a request and thus, a loss of service to the end user results. This may occur, for example, during a network failure. Thus, while containerized solutions are generally efficient, pod or container restarts can cause failures to occur.

Containerized application may be located within or proximal to a core network or a radio access network (RAN) of a telecommunications system. Core networks may, for example, have an evolved packet core (EPC) or 5G new radio (NR) service based architecture (SBA). The RAN may include base stations or access nodes. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)) and 6G RATs. Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RAT.

Because telecommunications networks are large and complex, failures in the containerized environment can be widespread. Accordingly, a solution is needed for remediating failures in a containerized environment within a telecommunications system.

Overview

Exemplary embodiments described herein include systems, methods, and processing nodes for failure remediation in container-based telecommunications systems. An exemplary method includes accessing, by a container as a service (CaaS) server, in communication with a core network, a CI/CD tool server. The method further includes experiencing a connectivity failure with the CI/CD tool server and accessing, by the CaaS server, an alternative repository created through real time replication of the CI/CD tool server contents.

A further exemplary method includes replicating selected contents of a continuous integration CI/CD tool server at an alternative repository. The method additionally includes receiving notification of a CI/CD server failure at a CaaS server, the CaaS server in communication with a core network and accessing the alternative repository from the CaaS server in response to a request for a service.

An exemplary system includes a CaaS server, in communication with a core network and a CI/CD tool server. The system further includes a failure remediation processor communicating with the CaaS server responsive to detecting a connectivity failure with the CI/CD tool server and an alternative repository, wherein the failure remediation processor directs the CaaS server to the alternative repository upon detection of the connectivity failure.

In yet a further exemplary embodiment, a processing nodes and non-transitory computer-readable mediums are provided. The processing nodes are capable of performing the operations identified above. The non-transitory computer-readable mediums store instructions, that when executed by a processor, cause the operations identified above to be performed.

BRIEF DESCRIPTION OF THE DRAWINGS

FIG. 6 is a flow chart illustrating a method performed in accordance with disclosed embodiments.

FIG. 7 is a flowchart illustrating a method performed in response to a service request in accordance with disclosed embodiments.

DETAILED DESCRIPTION

Exemplary embodiments described herein include systems, methods, processing nodes and non-transitory computer readable mediums for failure remediation in a telecommunications system utilizing containers. Specifically, the methods provided herein prevent loss of service due to network failures that cause container restarts.

Typically, in order to fulfill service requests, a container as a service (CaaS) platform attempts to access a CI/CD server. However, when network failures occur and pods or containers restart, the CI/CD server cannot be accessed. Accordingly, embodiments disclosed herein replicate CI/CD server contents in real time. In one embodiment, the CI/CD contents are replicated in real time and stored in a geo-redundant server located in a different data center than the CI/CD server. In yet another embodiment, the contents replicated in real time are stored in a proxy cache accessible to the CaaS server and geographically proximal to the CaaS server. In yet a further embodiment, the contents are replicated in real time and stored in both a geo-redundant server and a proxy cache. This replication enables fulfillment of service requests during network failures.

In embodiments provided herein, in the case of a network failure, a failure remediation system accesses the replicated contents from the proxy cache or from the geo-redundant server. The network failure may be due to cut fiber or other loss of connectivity between the CaaS server and the CI/CD tool server. When the network failure occurs, the pods and/or containers will be required to re-start. In the event of a re-start, the CaaS server will fail to access the necessary files from the CI/CD tool server. When the failure is corrected, the CI/CD tool server may deliver a readiness indicator to the failure remediation system indicating that the CI/CD tool server is again ready for access. Alternatively, the failure remediation system may perform intermittent health checks on the CI/CD tool server. In embodiments provided herein, the failure remediation system may be co-located with the CaaS server. Further, in embodiments provided herein, systems may include both a geo-redundant server at a remote location and a proxy cache stored locally with the CaaS server.

Figure 1:
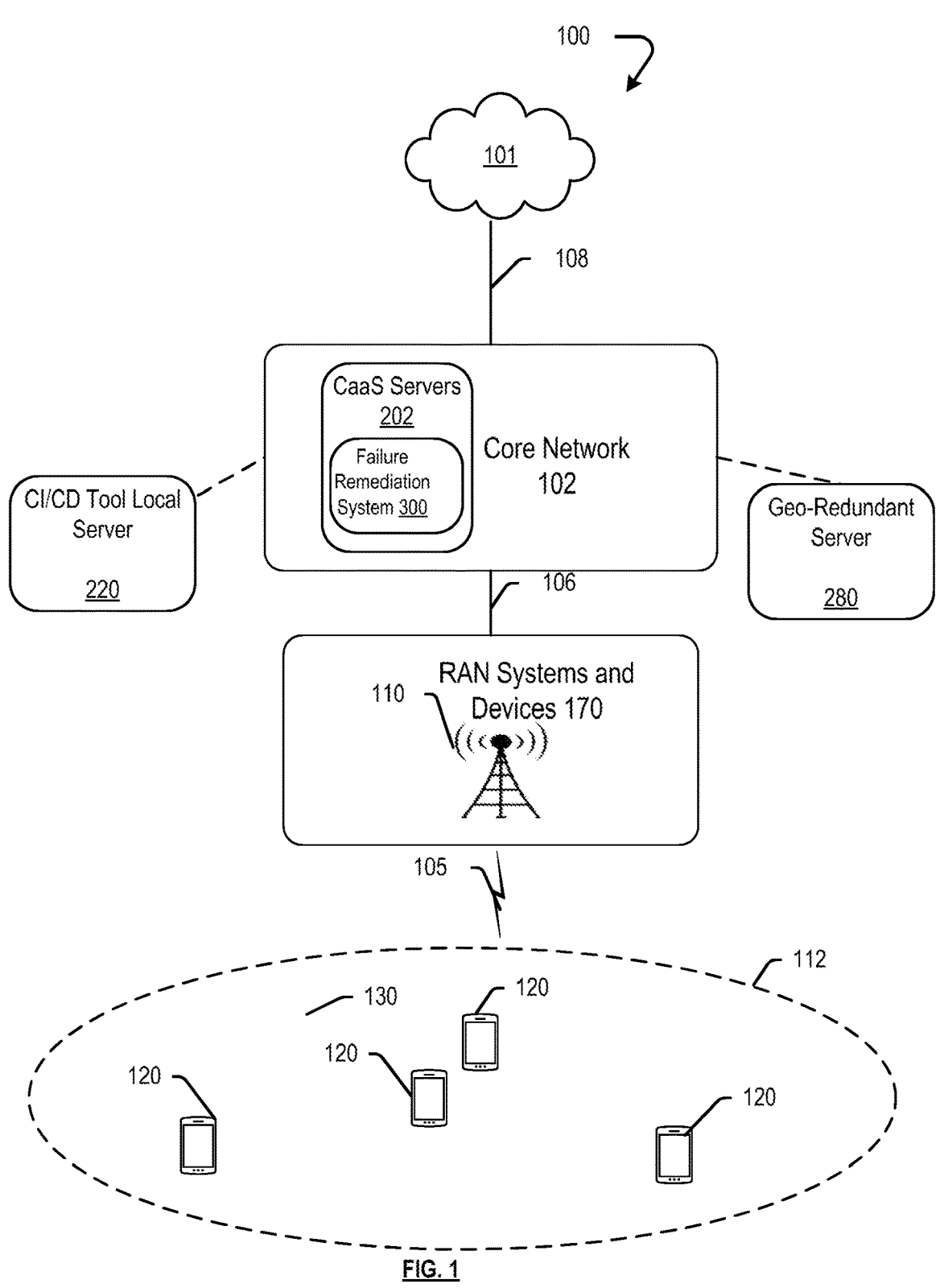
FIG. 1 depicts an exemplary operating environment for a failure remediation system in accordance with the disclosed embodiments.

FIG. 1 depicts an exemplary environment 100 for a failure remediation system 300 operating in conjunction with one or more CaaS servers 202, one or more CI/CD tool servers 220, and a geo-redundant server 280 in accordance with the disclosed embodiments. The environment 100 may include a communication network 101, a core network 102, and a radio access network (RAN) 170, including at least one access node 110. The core network 102 is connected to the communication network 101 over communication link 108 and to RAN 170 over the communication link 106. The RAN 170 may include other devices and additional access nodes.

The environment 100 also includes multiple wireless devices 120 which may be end-user wireless devices such as smart phones and may operate within one or more coverage areas 112. The wireless devices 120 in the coverage area 112 communicate with the RAN 170 over communication link 105, which may for example be a 5G NR and/or 4G LTE communication link.

The failure remediation system 300 and the CaaS servers 202 are shown as operating within the core network 102 and the CI/CD tool server 220 and the geo-redundant server 280 are shown as communicating with the core network 102. However, it should be noted that this configuration is merely exemplary and that these components may be in other locations. Further, the failure remediation system 300 may be distributed. For example, the failure remediation system 300 may utilize components located at the core network 102, the communication network 101, or the RAN 170. Alternatively, the failure remediation system 300 may be an entirely discrete component, such as a processing node.

In a typical deployment, in response to a service request, for example from a wireless device 120, the CaaS server 202 pulls necessary contents from the CI/CD tool server 220. The CI/CD tool server 220 may host container registry repository platforms, such as, for example, JFrog®, Harbor®, Dist®, Mirantis®, AWS®, IBM®, Google®, Alibaba®, and/or Azure® registries. CI/CD servers 220 may host multiple container registries serving multiple CaaS servers 202.

In embodiments provided herein, the failure remediation system 300 triggers creation of the geo-redundant server 280, which replicates the contents of the CI/CD tool server 220. Thus, when connectivity failures occur between the CaaS servers 202 and the local CI/CD servers 220, the failure remediation system 300 instructs the CaaS servers 202 to access the geo-redundant server 280.

In embodiments provided herein, the geo-redundant servers 280 include contents of the CI/CD tool server 220 replicated in real time based on instructions from the failure remediation system 300. For example, the geo-redundant server 280 includes software container images, helm charts, network service descriptors (NSDs), container configurations etc. stored in the CI/CD tool server 220. In some embodiments, CI/CD servers 220 may host multiple container registries serving multiple CaaS servers 202.

During fulfillment of a request, the CaaS servers 202 may initially attempt to access the CI/CD tool server 220. However, when the CI/CD tool server 220 is unavailable, the CaaS server 202 may failover to the geo-redundant server 280. When the CI/CD tool server 220 becomes available again, the CaaS servers 202 may again access the CI/CD tool server 220 instead of the geo-redundant server 280. In some embodiments, the CaaS servers 202 perform period health checks of the CI/CD tool servers 220. Further, the CI/CD tool servers 220 may generate and transmit a health check message to indicate service readiness to the CaaS Servers 202.

The failure remediation system 300 may store and execute instructions that direct the CaaS servers 202 in the event of a network failure. The failure remediation system 300 may further facilitate creation and maintenance of the geo-redundant server 280.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network 102 may have an evolved packet core (EPC) or may be structured using a service-based architecture (SBA). The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QOS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 120 and is responsible for handling connection and mobility management tasks. The SMF is primarily responsible for creating, updating, and removing sessions and managing session context. The UDM function provides services to other core functions, such as the AMF, SMF, and NEF. The UDM may function as a stateful message store, holding information in local memory. The NSSF can be used by the AMF to assist with the selection of network slice instances that will serve a particular device. Further, the NEF provides a mechanism for securely exposing services and features of the core network.

Communication links 106, 108 can use various communication media, such as air, space, metal, optical fiber, or some other signal propagation path, including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106 and 108 can be direct links or might include various equipment, intermediate components, systems, and networks, such as a cell site router, etc. Communication links 106 and 108 may comprise many different signals sharing the same link.

The RAN 170 may include various access network systems and devices such as access node 110. The RAN 170 is disposed between the core network 102 and the end-user wireless devices 120. Components of the RAN 170 may communicate directly with the core network 102 and others may communicate directly with the end user wireless devices 120. The RAN 170 may provide services from the core networks 102 to the end-user wireless devices 120. The RAN 170 includes at least an access node (or base station) 110 such as an eNodeB of gNodeB 110 communicating with the plurality of end-user wireless devices 120. It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access node 110 can be, for example, standard access nodes such as a macro-cell access node, a base transceiver station, a radio base station, an eNodeB device, an enhanced eNodeB device, a gNodeB in 5G New Radio ("5G NR"), or the like. The gNBs may include, for example, centralized units (CUs) and distributed units (DUs). Access node 110 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110 can comprise a processor and associated circuitry to execute or direct the execution of computer-readable instructions to perform operations such as those further described herein. Access nodes 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 120 may include any wireless device included in a wireless network. Wireless devices 120 may be any device, system, combination of devices, or other such communication platform capable of communicating wirelessly with access network 110 using one or more frequency bands and wireless carriers deployed therefrom and further capable of communicating with the network 101. Each of wireless devices 120, may be, for example, a mobile phone, a wireless phone, a wireless modem, a personal digital assistant (PDA), a voice over internet protocol (VoIP) phone, a voice over packet (VOP) phone, or a soft phone, an internet of things (IoT) device, as well as other types of devices or systems that can send and receive audio or data. The wireless devices 120 may be or include high power wireless devices or standard power wireless devices. Other types of communication platforms are possible.

The operations for failure remediation may be implemented as computer-readable instructions or methods, and processing nodes on the network for executing the instructions or methods. The processing node may include a processor included in the access node or a processor included in any controller node in the wireless network that is coupled to the access node.

Figure 2:
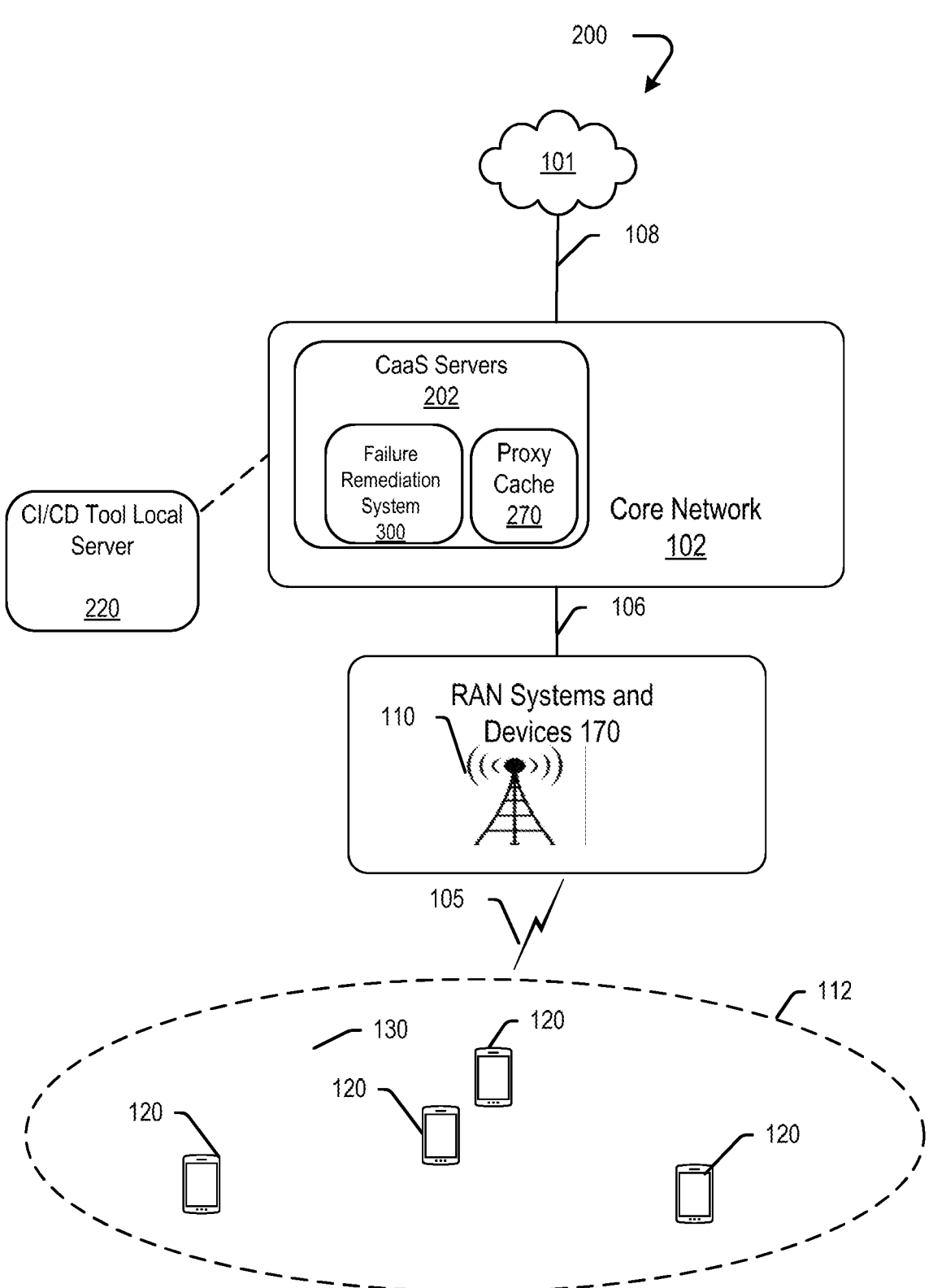
FIG. 2 illustrates a further operating environment for a failure remediation system in accordance with disclosed embodiments.

FIG. 2 depicts a further exemplary environment 200 for a failure remediation system 300 in accordance with the disclosed embodiments. The environment 200 may include a communication network 101, a core network 102, and a radio access network (RAN) 170, including at least one access node 110. The core network 102 is connected to the communication network 101 over communication link 108 and to the network 101 over the communication link 106. The RAN 170 may include other devices and additional access nodes. Like reference numerals in FIG. 2 refer to the corresponding components of FIG. 1 described above. The environment 200 includes CaaS servers 202 that include or communicate with both the failure remediation system 300 and a proxy cache 270. The CaaS servers 202 may have dedicated storage to host the local repository or proxy cache 270.

The proxy cache 270 replicates selected contents from the CI/CD tool servers 220. The proxy cache 270 maintains a local copy of selected contents for the CI/CD tool servers 220. In embodiments provided herein, the failure remediation system 300 may cause the proxy cache 270 to be created and maintained in real time. The proxy cache 270 may maintain copies of contents of the CI/CD tool server 220, including for example, container images, Helm charts, and container configurations. The failure remediation system 300 may cause the CaaS server 202 to dynamically pull the data for the proxy cache 270 from the CI/CD tool server 220. In some embodiments, CI/CD servers 220 may host multiple container registries serving multiple CaaS servers 202.

While the geo-redundant servers 280 described with respect to FIG. 1 may include a complete replication of the CI/CD tool server 220, the proxy cache 270 may include only selected contents. For example, if the CaaS server 202 is used to deploy a 5G UDM, then the CaaS server 202 is instructed by the failure remediation system 300 to pull only UDM related container images from the CI/CD tool server 220 for the proxy cache 270. Thus, the 5G UDM CaaS server 202 will not copy contents for the proxy cache 270 that are pertinent to the AMF, the SMF, or other functions.

In embodiments provided herein, the CaaS servers 202 dedicate local storage to hosting the proxy cache 270. However, in standard operation, the CaaS servers 202 access the CI/CD tool servers 220 in order to fulfill a service request. Only in event of a failure as detected by the failure remediation system 300 will CaaS server 202 be triggered to fulfill a service request by accessing the proxy cache 270.

The environment 200 also includes multiple wireless devices 120 which may be end-user wireless devices such as smart phones and may operate within one or more coverage areas 112 as described above. Communication network 101, core network 102, communication links 106, 108, RAN 170, access node 110, and end user wireless devices 120 are substantially as described above with respect to FIG. 1

Environments 100 and 200 may further include many components not specifically shown in FIG. 1 or 2 including processing nodes, controller nodes, routers, gateways, and physical and/or wireless data links for communicating signals among various network elements. Environments 100 and 200 may include one or more of a local area network, a wide area network, and an internetwork (including the Internet). Environments 100 and 200 may be capable of communicating signals and carrying data, for example, to support voice, push-to-talk, broadcast video, and data communications by end-user wireless devices 120. Environments 100 and 200 may include additional base stations, controller nodes, telephony switches, internet routers, network gateways, computer systems, communication links, or other type of communication equipment, and combinations thereof.

Further, it should be noted that the embodiments of FIGS. 1 and 2 may be combined such that both a proxy cache 270 and a geo-redundant server 280 are provided as backup options in the event of a failure or re-start of pods or containers from the CI/CD tool server 220. In the interest of efficiency, upon detection of a failure by the failure remediation system 300, the CaaS server 202 would first access the proxy cache 270 and would access the geo-redundant server 280 if the proxy cache 270 is corrupted or unavailable.

Other network elements may be present in the environments 100 and 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access networks 170 and the core network 102.

The methods, systems, devices, networks, access nodes, and equipment described herein with respect to FIGS. 1 and 2 may be implemented with, contain, or be executed by one or more computer systems and/or processing nodes. The methods described above may also be stored on a non-transitory computer readable medium. Many of the elements of communication environments 100 and 200 may be, comprise, or include computers systems and/or processing nodes, including access nodes, controller nodes, and gateway nodes described herein.

Figure 3:
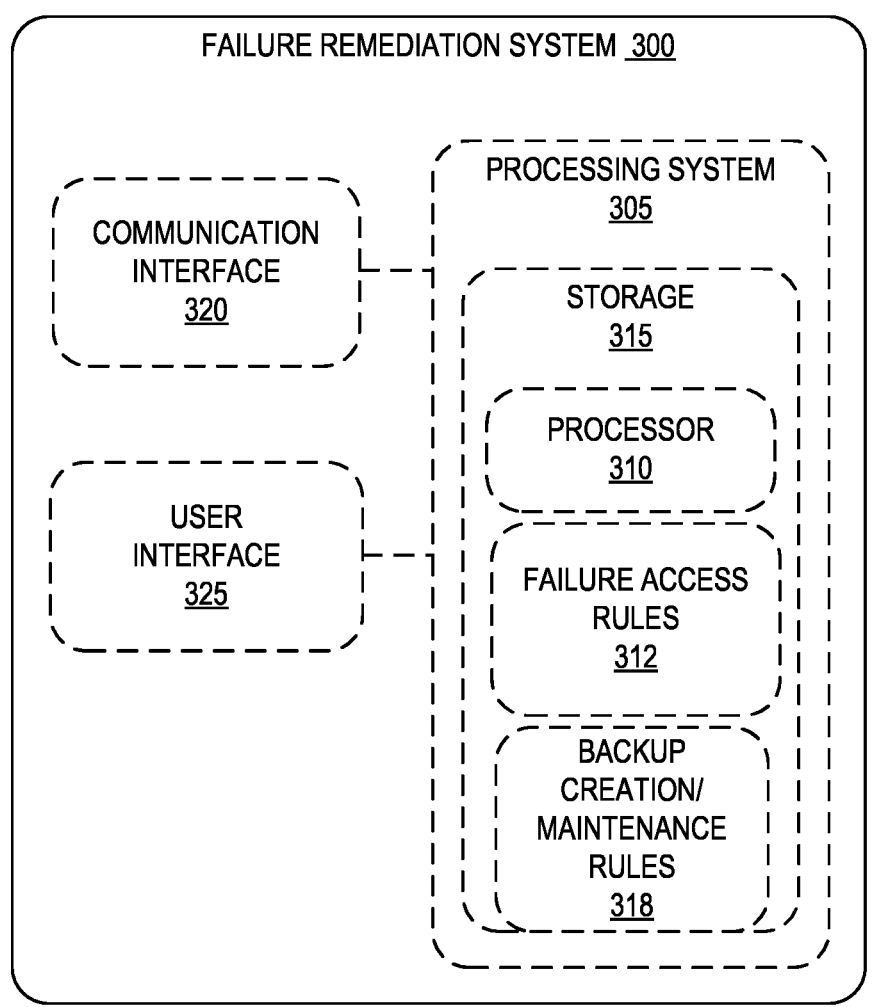
FIG. 3 illustrates a failure remediation system in accordance with disclosed embodiments.

FIG. 3 depicts further details of the failure remediation system 300, which may be configured to perform the methods and operations disclosed herein to prepare for network failures and handle service requests in the event of network failures and/or container or pod restarts. In the disclosed embodiments, the failure remediation system 300 may be integrated with the core network 102, RAN 170, may be distributed, or may be an entirely separate component, such as a processing node, capable of communicating with the core network 102 and/or RAN 170.

The failure remediation system 300 may be configured to operate based on service requests received from wireless devices 120 or other network entities. Further, the failure remediation system 300 directs creation and maintenance of backup systems for use during network failures.

To provide appropriate services, the failure remediation system 300 includes a processing system 305. Processing system 305 may include a processor 310 and a storage device or memory 315. Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include one or more modules for performing various operations described herein. For example, failure access rules 312 may be provided to include instructions to determine appropriate access steps upon detection of a network failure and further upon network restoration. Failure access rules 312 may further include instructions for failure detection and verification. Thus, using the failure access rules 312, the failure remediations system 300 may detect and verify connectivity failures and provide instructions to the CaaS server 202 for proceeding with the fulfillment of a request upon identification of a failure. Additionally, backup creation and maintenance rules 318 may include instructions for enabling creation of the geo-redundant server 280 and/or the proxy cache 270. Processor 310 may be a microprocessor and may include hardware circuitry and/or embedded codes configured to retrieve and execute software stored in storage device 315.

Communication interface 320 may include hardware components, such as network communication ports, circuitry, devices, routers, wires, antenna, transceivers, etc. These components may, for example, receive requests from the wireless devices 120. User interface 325 may be configured to allow a user to provide input to the failure remediation system 300 and receive data or information from the failure remediation system 300. User interface 325 may include hardware components, such as touch screens, buttons, displays, speakers, etc. The enhanced entitlement system 300 may further include other components such as a power management unit, a control interface unit, etc.

The failure remediation system 300 thus may utilize the memory 315 and the processor 310 to perform multiple operations. For example, the processor 310 may access stored instructions in the memory 315 to determine which repository should be utilized for fulfilling service requests. The location of the failure remediation system 300 may depend upon the network architecture. For example, in smaller networks, a single failure remediation system 300 may be disposed for communication with core network 102 and/or CaaS servers 202. However, in a larger network, multiple failure remediation systems 300 may be required to cover the network.

Figure 4:
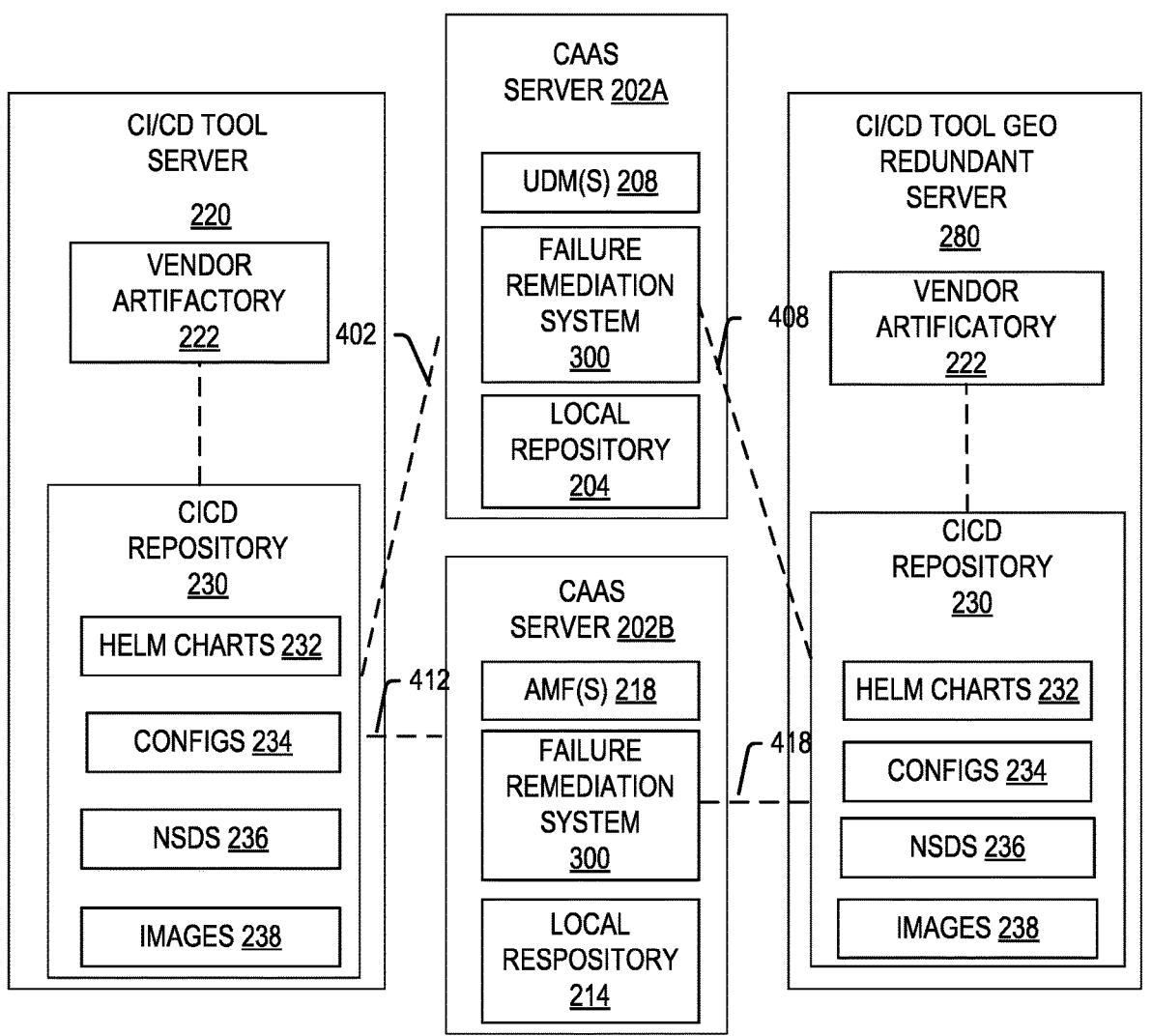
FIG. 4 is a block diagram illustrating interactions of a failure remediation system in accordance with disclosed embodiments.

FIG. 4 is a block diagram of an environment 400 illustrating interactions of the failure remediation system 300 in accordance with disclosed embodiments. Specifically, FIG. 4 illustrates interaction between the CI/CD tool server 220, a CaaS server 202A, a CaaS server 202B, and CI/CD geo-redundant server 280.

The CI/CD tool server 220 includes, for example, a CI/CD repository 230 storing contents such as Helm charts 232, container configurations 234, NSDS 236 and container images 238. These contents may be pulled from a vendor artifactory 222. Further, the CaaS servers 202A and 202B include or communicate with the failure remediation system 300 and local repositories 204 and 214. Whereas CaaS server 202A includes UDM(s) 208, CaaS server 202B includes AMF(s) 218. The CI/CD geo-redundant server 280 includes contents replicated from the CI/CD tool server 220.

In operation, the CaaS server 202A may attempt at 402 to pull data from the CI/CD tool server 220 in response to a service request. In embodiments provided herein, the CaaS server 202A may fail to pull the data due to a network interruption or connectivity failure that may cause pod or container restarts. Thus, the failure remediation system 300 may determine that a failure has occurred and may direct the CaaS server 202A to pull the data at 408 from the CI/CD geo-redundant server 280.

Similarly, the CaaS server 202B may attempt at 412 to pull data from the CI/CD tool server 220 in response to a service request and may fail to pull the data. Thus, the failure remediation system 300 may determine that a failure has occurred and may direct the CaaS server 202B to pull the data at 418 from the CI/CD geo-redundant server 280.

Figure 5:
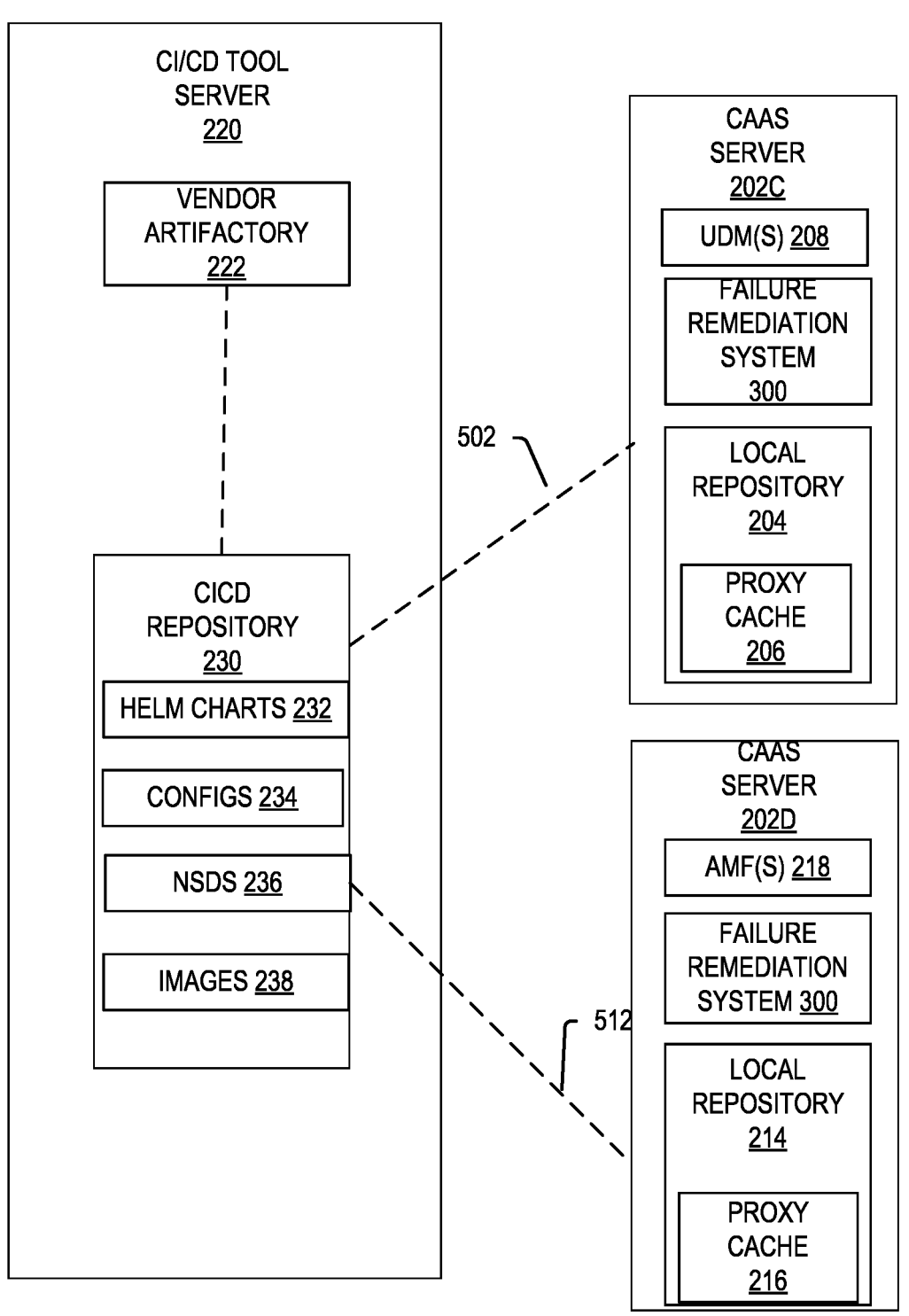
FIG. 5 is a block diagram illustrating interactions of a failure remediation system in accordance with further disclosed embodiments.

FIG. 5 is a block diagram of an environment 500 illustrating interactions of the failure remediation system 300 in accordance with further disclosed embodiments. Specifically, FIG. 5 illustrates interactions between the CI/CD tool server 220, CaaS server 202C, and CaaS server 202D.

The CI/CD tool server 220 is as described above and includes, for example, a CI/CD repository 230 storing contents such as Helm charts 232, container configurations 234, NSDS 236, and container images 238. These contents may be pulled from a vendor artifactory 222. Further, the CaaS servers 202C and 202D include or communicate with the failure remediation system 300, local repositories 204 and 214, and proxy caches 206 and 216. The proxy caches 206 and 216 may be stored in the local repositories 204 and 214 as the local repositories 204 and 214 may function as dedicated storage for the proxy caches 206 and 216. Whereas CaaS server 202C includes UDM(s) 202, CaaS server 202D includes AMF(s) 218. The proxy caches 206 and 216 include contents replicated from the CI/CD tool server 220.

More specifically, the failure remediation system 300 of the CaaS server 202C pulls relevant contents from the CI/CD tool server 220 at 502 for storage in the proxy cache 206. For the CaaS server 202C, the relevant contents include only UDM related contents. Similarly at 512, the CaaS server 202D pulls relevant contents from the CI/CD tool server 220 for storage in the proxy cache 216. The relevant contents for the CaaS server 202D would include only AMF related contents. Thus, the CaaS platform pulls only the desired repository data for cloud native applications hosted on the particular platform rather than pulling complete repositories or registries.

As will be further described below, CaaS servers 202C and 202D pull contents from their respective proxy caches 206 and 216 upon failure detection by the failure remediation system 300. Thus, when the CaaS servers 202C and 202D fail to pull contents from the CI/CD tool server 220, the failure remediation system 300 directs the CaaS servers 202C and 202D to pull contents from the respective proxy caches 206 and 216.

Further, in embodiments provided herein, the CaaS servers 202C and 202D may default to pull information from the proxy caches 206 and 216 in response to a service request, without any failure occurrence. Accordingly, in this scenario, the CaaS servers 202C and 202D pull information from the CI/CD server 2220 in order to populate the proxy caches 206 and 216, but do not generally access the CI/CD server 220 to fulfill service requests, since the proxy caches 206 and 216 provide a quicker and more reliable source for fulfilling service requests. However, in the event that cache data is corrupted or unavailable, the CaaS servers 202C and 202D may pull information from the CI/CD tool server 220 in order to fulfill a service request.

The disclosed methods for failure remediation are discussed further below with reference to FIGS. 6-9. FIG. 6 illustrates an exemplary method 600 for creating backup repositories for failure remediation. Method 600 may be performed by any suitable processor discussed herein, for example, the processor 310 included in the failure remediation system 300.

Method 600 begins in step 610, when the failure remediation system 300 recognizes a connected CI/CD tool server. Upon recognition of the connected CI/CD tool server at 610, the failure remediation system causes the contents of the CI/CD tool server 220 to be continuously replicated in step 620.

Thus, in step 620, the contents of the CI/CD server 220 may be continuously replicated in real time to a geo-redundant server 280 in an alternate location. As a further alternative, the contents of the CI/CD server 220 may be continuously replicated in real time to a proxy cache 270. When the contents are replicated to a proxy cache, replicating the contents may further include selecting particular contents for replication. For example, if the CaaS server attempting to access contents only performs UDM related functions, then only UDM related contents will be replicated to the proxy cache stored locally at the CaaS server. Similarly if the CaaS server handles only AMF related requests, the only AMF related contents will be replicated to the proxy cache stored locally at the CaaS server. Additionally, the continuous replication may include replication both to a proxy cache stored locally at the CaaS server and to a geo-redundant server in an alternate location.

FIG. 7 illustrates an exemplary method 700 for processing a service request from the CaaS tool server 202. Method 700 may be performed by any suitable processor discussed herein, for example, a processor of the CaaS tool server 202 in combination with the processor 310 included in the failure remediation system 300.

Method 700 begins in step 710, when the CaaS tool server 202 receives a service request, for example, from the mobile device 120. The service request may alternatively be received from any other network entity.

Upon receiving the request in step 710, the CaaS tool server 202 may attempt to access contents of the CI/CD tool server 220 in order to fulfill the service request in step 720. In some instances, in step 730, the CaaS server 202 will experience a connectivity failure in step 730 and trigger the failure remediation system 300. The failure remediation system 300 causes the CaaS tool server 202 to access an alternative repository created by real time replication in step 740. Accordingly, the CaaS tool server 202 is able to fulfill the service request by delivering the requested service from the alternative repository based on the contents of the alternative repository. As described above, the alternative repository may be or include a geo-redundant server 280 or a local proxy cache 270.

Figure 8:
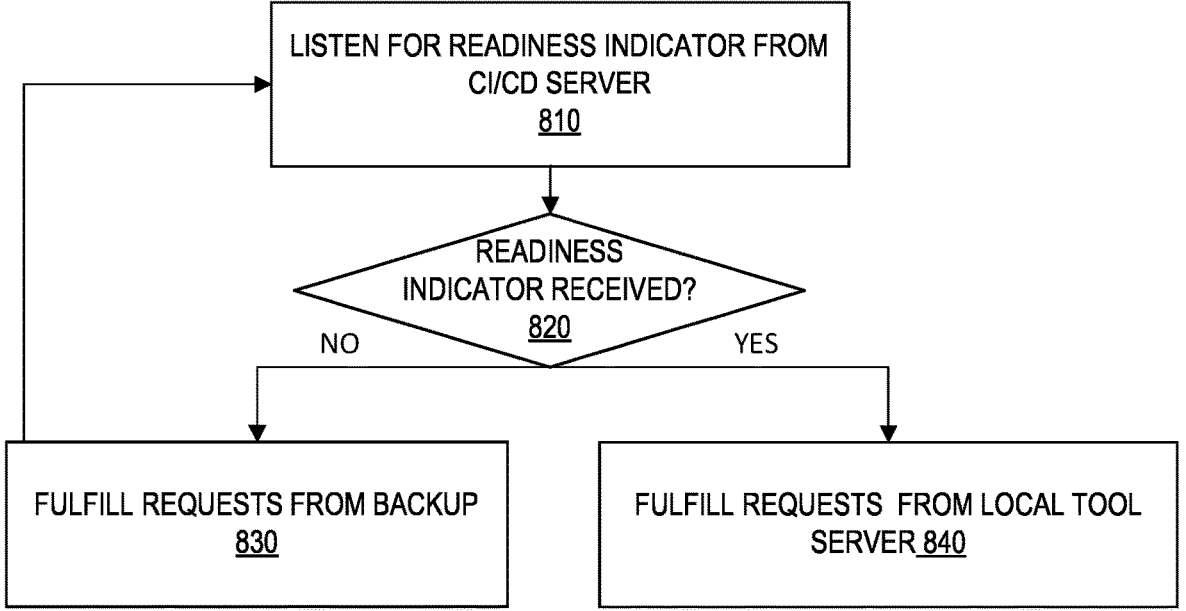
FIG. 8 is a flowchart depicting a further exemplary method in accordance with disclosed embodiments.

FIG. 8 is a flowchart depicting a further exemplary method 800 for performing a failure remediation method in accordance with disclosed embodiments. Method 800 may be performed by any suitable processor discussed herein, for example, the processor 310 included in the failure remediation system 300.

Method 800 begins in step 810, when the failure remediation system 300 listens for a readiness indicator from the CI/CD server 220. In embodiments provided herein, the method 800 may be triggered by a connectivity failure. For example, the method 800 may be performed after encountering a connectivity failure as described above with respect to the method 700. In this instance, the CaaS tool server 202 has already been instructed by the failure remediation system 300 to fulfill requests from an alternative repository 270, 280.

If the failure remediation system 300 receives a readiness indicator from the CI/CD tool server 220 in step 820, the failure remediation system 300 instructs the CI/CD server 202 to resume fulfilling requests from the CI/CD tool server 220 in step 840. However, if the failure remediation system 300 does not receive a readiness indicator in step 820, the failure remediation system 300 instructs the CaaS server 202 to continue fulfilling requests from the backup repository in step 830. The backup repository may be or include, for example, the geo-redundant server 280 or the proxy cache 270.

While the CaaS server 202 continues to fulfill requests from the backup repository in step 830, the failure remediation system 300 continues to listen for a readiness indicator from the CI/CD server 220. When the readiness indicator is received at the failure remediation system 300, the CaaS server 202 may resume fulfilling requests from the CI/CD tool server 202 until another network interruption occurs. In some instances, passive listening for a readiness indicator may be replaced by active investigation in the form of a periodic health check performed by the failure remediation system 300.

Figure 9:
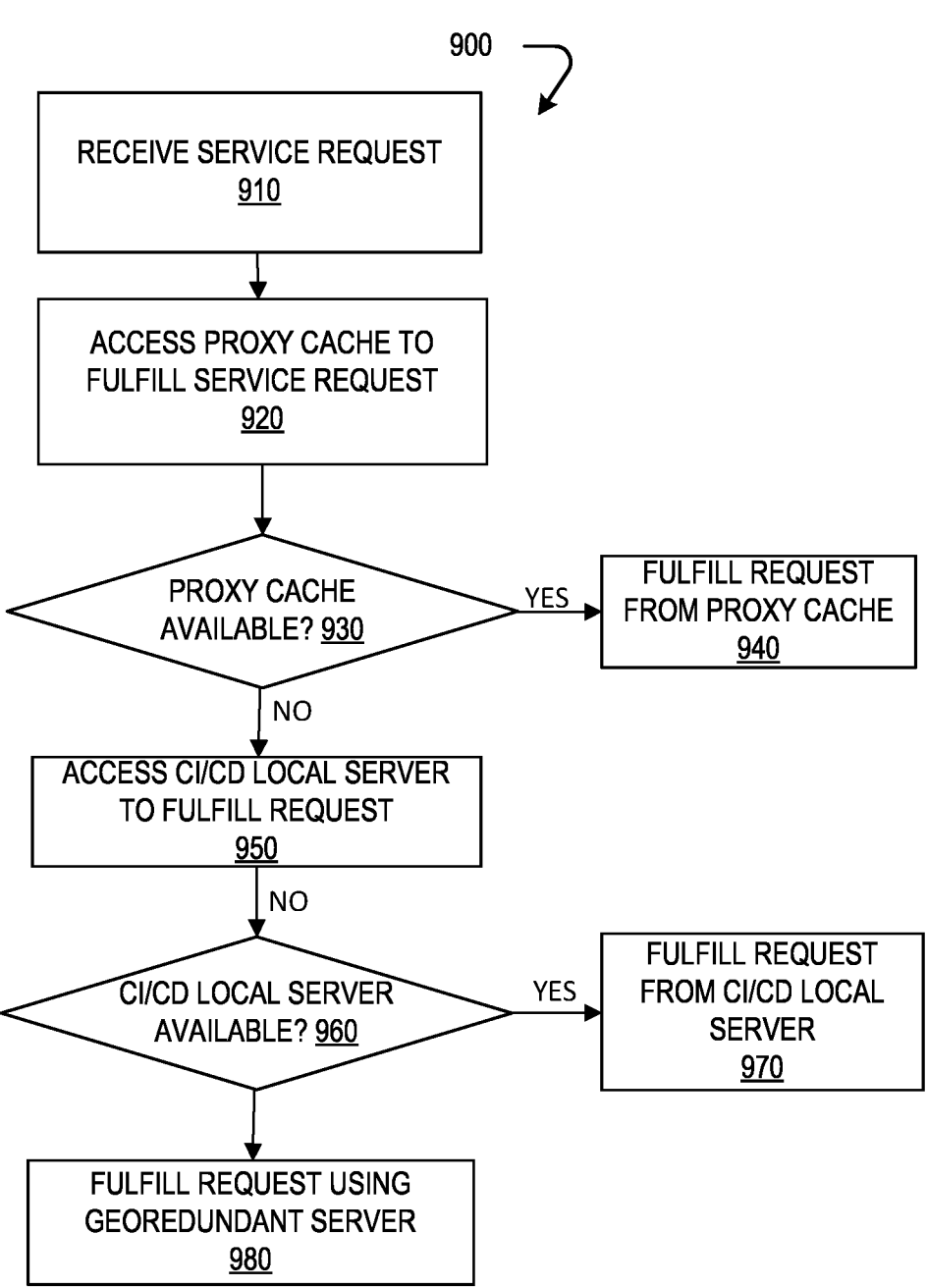
FIG. 9 is a flowchart illustrating a method performed in response to a request for services in accordance with a further disclosed embodiment.

FIG. 9 is a flowchart illustrating a method 900 performed in response to a request for services received at the CaaS server 202. Method 900 may be performed by the CaaS 202 server in combination with the failure remediation system 300. The method 900 may be performed by a system having multiple alternative repositories, for example, two alternative backup systems including both the proxy cache 270 and the geo-redundant server 280.

The method begins in step 910, when the CaaS server 202 receives a service request from a wireless device 120 or from another entity connected to the network. In step 920, the CaaS server accesses the proxy cache 270 in order to fulfill the service request. As the proxy cache is local, accessing the proxy cache takes very little time. Thus, in step 930, the CaaS server 202 determines whether the proxy cache 270 is available. The proxy cache may become unavailable due to corrupted data, network interruption, or other unforeseen events. If the proxy cache 270 is available in step 930, the CaaS server 202 fulfills the service request from the proxy cache 270 in step 940.

However, if the proxy cache 270 is unavailable in step 930, due to corrupted data, network interruptions, or other factors, the CaaS server 202 attempts to access the CI/CD tool server 220 in step 950 in order to fulfill the request. If the CI/CD tool server is available in step 960, the CaaS server 202 accesses the CI/CD tool server 220 in step 970 in order to fulfill the service request.

However, in some instances, due to network interruptions, container or pod restarts, or other events, the CI/CD tool server 220 may become unavailable. If the CI/CD tool server 202 is deemed unavailable in step 960, the CaaS server 202 fulfills the request by accessing the geo-redundant server 280 in step 980.

In some embodiments, methods 600, 700, 800, and 900 may include additional steps or operations. Furthermore, the methods may include steps shown in each of the other methods. As one of ordinary skill in the art would understand, the methods 600, 700, 800, and 900 may be integrated in any useful manner and the steps may be performed in any useful sequence.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all be within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:

accessing by a container as a service (CaaS) server in communication with a core network, a continuous integration (CI)/continuous delivery (CD) tool server;

experiencing a connectivity failure with the CI/CD tool server, and in response to experiencing the connectivity failure, performing operations including;

determining whether a first alternative repository including a local proxy cache stored at the CaaS server is available, the local proxy cache stored in a local repository at the CaaS server, the local repository providing dedicated storage for the local proxy cache, wherein the local proxy cache is created through real time duplication of selected contents of the CI/CD tool server;

finding the local proxy cache at the CaaS server is unavailable;

accessing by the CaaS server a second alternative repository created through real time replication of contents of the CI/CD tool server upon finding the local proxy cache is unavailable, wherein the second alternative repository is a geo-redundant server at a remote location; and listening at the CaaS server for a readiness indicator from the CI/CD tool server while accessing the second alternative repository.

2. The method of claim 1, wherein the CaaS server accesses the CI/CD tool server in response to a service request and delivers the requested service based on contents of the second alternative repository.

3. The method of claim 1, further comprising creating the second alternative repository as the geo-redundant server through real time replication of complete contents of the CI/CD tool server.

4. The method of claim 1, further comprising performing a periodic health check of the CI/CD tool server from the CaaS server.

5. The method of claim 4, wherein the operations further include receiving at the CaaS server a readiness indicator from the CI/CD tool server and reverting to the CI/CD tool server from the first alternative repository or second alternative repository.

6. The method of claim 1, wherein the local proxy cache is unavailable due to corrupted data or a network.

7. The method of claim 1, further comprising selecting contents of the CI/CD tool server for real time duplication to create the local proxy cache based on the contents of the CaaS server.

8. The method of claim 7, wherein selecting the contents of the CI/CD tool server for real time duplication comprises selecting the contents of the CI/CD tool server that correspond to cloud native applications hosted on the CaaS server.

9. A method comprising:

replicating contents of a continuous integration (CI)/continuous delivery (CD) server at a first and second alternative repository;

receiving notification of a CI/CD server failure at a container as a service (CaaS) server, the CaaS server in communication with a core network;

triggering a failure remediation system at the CaaS server in response to the received notification, the failure remediation system performing operations including:

accessing the first alternative repository including a local proxy cache on the CaaS server in response to a request for a service, the local proxy cache stored in a local repository at the CaaS server, the local repository providing dedicated storage for the local proxy cache, wherein the local proxy cache is created through real time duplication of selected contents of the CI/CD tool server;

finding the local proxy cache on the CaaS server is unavailable;

accessing by the CaaS server the second alternative repository created through real time replication of contents of the CI/CD tool server upon finding the local proxy cache is unavailable, wherein the second alternative repository is a geo-redundant server in a remote location; and listening, at the failure remediation system for a readiness indicator from the CI/CD tool server while accessing the second alternative repository.

10. The method of claim 9, further comprising selecting contents of the CI/CD server for real time duplication to create the local proxy cache based on the contents of the CaaS server.

11. The method of claim 10, wherein selecting the contents of the CI/CD server for real time duplication to create the local proxy cache comprises selecting the contents of the CI/CD server that correspond to cloud native applications hosted on the CaaS server.

12. The method of claim 11, wherein the cloud native applications relate to fifth generation (5G) core network functions.

13. The method of claim 11, further comprising receiving at the CaaS server the readiness indicator from the CI/CD tool server and reverting to the CI/CD tool server from one of the alternative repositories.

14. A system comprising:

a container as a service (CaaS) server in communication with a core network and a continuous integration (CI)/continuous delivery (CD) tool server;

at least two alternative repositories including a local proxy cache on the CaaS server and a geo-redundant server in an alternative remote location from the CaaS server, the local proxy cache stored in a local repository at the CaaS server, the local repository providing dedicated storage for the local proxy cache, wherein the local proxy cache is created through real time duplication of selected contents of the CI/CD tool server; and a failure remediation processor co-located with the CaaS server and triggered to instruct the CaaS server responsive to detecting a connectivity failure between the CaaS server and the CI/CD tool server, wherein the failure remediation processor instructs the CaaS server to access one of the two alternative repositories upon detection of the connectivity failure, wherein the failure remediation processor triggers the CaaS server to access the local proxy cache prior to accessing the geo-redundant server, and wherein the failure remediation processor listens for a readiness indicator from the CI/CD tool server while accessing one of the two alternative repositories.

15. The system of claim 14, wherein the CaaS server accesses the CI/CD tool server in response to a service request and delivers the requested service based on contents of one of the two alternative repositories.

16. The system of claim 14, wherein the geo-redundant server is created through real time replication of complete contents of the CI/CD tool server.

17. The system of claim 14, wherein the failure remediation processor is programmed to perform a periodic health check of the CI/CD tool server.

18. The system of claim 14, wherein the failure remediation processor selects contents of the CI/CD server for real time duplication to create the local proxy cache based on the contents of the CaaS server.

19. The system of claim 18, wherein the selected contents of the CI/CD tool server for real time duplication to create the local proxy cache include contents of the CI/CD tool server that correspond to cloud native applications hosted on the CaaS server.

20. The system of claim 19, wherein the cloud native applications correspond to a fifth generation (5G) core network function.

* * * * *